United States Patent
Choi et al.

(10) Patent No.: US 11,086,983 B2
(45) Date of Patent: Aug. 10, 2021

(54) SYSTEM AND METHOD FOR AUTHENTICATING SAFE SOFTWARE

(71) Applicant: Seung Hwan Choi, Namyangju-si (KR)

(72) Inventors: Seung Hwan Choi, Namyangju-si (KR); Jeong Min Kim, Seoul (KR); Yeong Bin Song, Seoul (KR)

(73) Assignee: Seung Hwan Choi, Namyangju-si (KR)

( * ) Notice: Subject to any disclaimer, the term of this patent is extended or adjusted under 35 U.S.C. 154(b) by 0 days.

(21) Appl. No.: 16/585,094

(22) Filed: Sep. 27, 2019

(65) Prior Publication Data
US 2020/0026846 A1 Jan. 23, 2020

Related U.S. Application Data

(63) Continuation of application No. PCT/KR2017/013160, filed on Nov. 20, 2017.

(30) Foreign Application Priority Data

Mar. 29, 2017 (KR) .................. 10-2017-0040046

(51) Int. Cl.
*G06F 21/44* (2013.01)
*G06F 21/52* (2013.01)

(52) U.S. Cl.
CPC .............. *G06F 21/44* (2013.01); *G06F 21/52* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 8,161,552 B1* | 4/2012 | Sun .................. | G06F 21/566 726/22 |
| 2011/0225655 A1* | 9/2011 | Niemela .............. | G06F 21/565 726/24 |

(Continued)

FOREIGN PATENT DOCUMENTS

| | | |
|---|---|---|
| KR | 20100089245 A | 8/2010 |
| KR | 20110104373 A | 9/2011 |

(Continued)

OTHER PUBLICATIONS

Huh et al., An Empirical Study on the Software Integrity of Virtual Appliances: Are you Really Getting What You Paid For? 2013 Asia CCS'13, pp. 231-242 (Year: 2013).*

(Continued)

*Primary Examiner* — Luu T Pham
*Assistant Examiner* — Edward X Long
(74) *Attorney, Agent, or Firm* — Dinsmore & Shohl LLP; Yongsok Choi, Esq.

(57) ABSTRACT

A safety software authentication terminal and a method thereof are provided, and when a safety software authentication is performed, software executed among a plurality of types of installed software is detected as a white list verification target, and whether or not to register detected verification target software in a white list, and when the verification target software is not registered in the white list, a grade is determined for the verification target software based on the number of satisfying conditions among a plurality of preset conditions, and when the grade can be registered in the white list, the verification target software is added to the whitelist, and the plurality of conditions include at least one of technical conditions that an operating system of the terminal is checkable and social engineering conditions that are checkable based on a behavior of a user.

8 Claims, 3 Drawing Sheets

(56) References Cited

U.S. PATENT DOCUMENTS

2013/0097659 A1    4/2013  Das et al.
2017/0099306 A1*   4/2017  Chiu .................. H04L 63/1425
2018/0075239 A1*   3/2018  Boutnaru ............... G06F 21/60

FOREIGN PATENT DOCUMENTS

KR         20150056244 A    5/2015
KR           101614809 B1    4/2016

OTHER PUBLICATIONS

Tegeler et al., BotFinder: Finding Bots in Network Traffic Without Deep Packet Inspection, 2012 Co-Next'12, pp. 349-360 (Year: 2012).*
International Search Report for PCT/KR2017/013160 dated Mar. 9, 2018.

\* cited by examiner

SYSTEM AND METHOD FOR AUTHENTICATING SAFE SOFTWARE

CROSS REFERENCE TO RELATED APPLICATION

This application is a continuation of PCT/KR2017/013160 filed on Nov. 20, 2017, which claims priority to Korean Patent Application No. 10-2017-0040046 filed on Mar. 29, 2017, the entire contents of which are herein incorporated by reference.

BACKGROUND OF THE INVENTION

1. Field of the Invention

The present invention relates to a system and a method that recognize and authenticate safety software among a plurality of types of software executed by a terminal device.

2. Description of the Related Art

Most terminal devices such as a personal computer (PC), a mobile terminal, and an Internet of things (IoT) device execute various types of software such as a utility, a security, a tool, a text editor, a game, and a viewer. In order to safely use the software, a software authentication processing method through an officially approved certificate authority is generally used for a file and an electronic signature.

However, malicious software also uses an electronic signature, thereby, being able to be executed disguisedly as normal software. Further, there is a case where even the normal software does not have the electronic signature due to activation of freeware and shareware. Accordingly, a formal method such as software authentication which uses an existing electronic signature has a limitation in authenticating safety software. Thereby, a damage caused by malicious software such as ransomware that is not detected by vaccines or other security solutions is increasing.

Recently, a spam mail has been increasing explosively, phishing and pharming sites pretending to be financial and payment companies for personal information leakage have been increasing, and thereby, a white list has emerged to verify an IP address or site by a third party. The white list is an opposite concept of a black list which creates a database (DB) of the spam mail, the IP address distributing a malicious code, a fake site for promoting the phishing, and the like. The white list is made in a known IP address, an email sent from the IP address is always accepted by a mail server, or a bank and various portal sites voluntarily registers a security company and an organization in the white list, and thereby, a consumer (that is, a communication terminal user or the like) may be informed of safety of the Web site.

However, it is difficult to include lots of software information in the white list by using the existing white list-based authentication method, and also lacks ability to authenticate safety software. Accordingly, there is a need for a method of authenticating user software of a safe operation, information, and a behavior by collecting the operation, behavior, and information from installation of the software and analyzing a software use behavior of a user. Further, in a process of incorporating safety software into the whitelist, there is a need for a method of fundamentally blocking an operation of the malicious software that the user does not know even if the user does not register the software one by one.

SUMMARY OF THE INVENTION

One embodiment of the present invention is to provide a safety software authentication system and a method thereof that may block an operation of malicious software by collecting an operation, a behavior, and information from installation of software, analyzing a software use behavior of a user, and authenticating software of a safe operation, the information, and the behavior.

However, a technical problem to be solved by the present embodiment is not limited to the technical problems described above, and another technical problem may exist.

As technical means for solving the above-described technical problems, a safety software authentication terminal according to one embodiment of the present invention includes a memory that stores a safety software authentication program, and a processor that executes the program stored in the memory. The processor detects software executed among a plurality of types of software installed in the terminal as a whitelist verification target, according to execution of the safety software authentication program, determines whether or not to register a verification target software in a white list, normally executes the verification target software when the verification target software is registered in the white list, determines a grade for the verification target software based on the number of satisfying conditions among a plurality of preset conditions when the verification target software is not registered in the white list, and adds the verification target software to the whitelist when the grade is capable of being registered in the white list. The plurality of conditions include at least one of technical conditions that an operating system of the terminal is checkable and social engineering conditions that are checkable based on a behavior of a user.

Further, a safety software authentication method performed by a safety software authentication terminal according to another embodiment of the present invention includes (a) detecting software executed among a plurality of types of installed software as a whitelist verification target; (b) determining whether or not to register a verification target software in a white list; (c) determining a grade for the verification target software based on the number of satisfying conditions among a plurality of preset conditions when the verification target software is not registered in the white list; and (d) adding the verification target software to the white list when the grade is capable of being registered in the white list. The plurality of conditions include at least one of technical conditions that an operating system of the terminal is checkable and social engineering conditions that are checkable based on a behavior of a user.

Further, a computer readable storage medium according to still another embodiment of the present invention records a program for executing (a) detecting software executed among a plurality of types of installed software as a whitelist verification target; (b) determining whether or not to register a verification target software in a white list; (c) determining a grade for the verification target software based on the number of satisfying conditions among a plurality of preset conditions when the verification target software is not registered in the white list; and (d) adding the verification target software to the white list when the grade is capable of being registered in the white list.

Advantageous Effects

According to one embodiment of the present invention, by analyzing an installation and an operation status of software and information generated therefrom, detecting and comparing common items, and checking a state in which the software is executed by a user and an operation behavior of the user, it is possible to determine whether or not an operation state of the software is normal or abnormal. Through this, it is possible to provide a criterion for quickly and accurately determining a zombie PC, a botnet, malicious virus, ransomware, and a mutant behavior.

Further, according to one embodiment of the present invention, by using a method of analyzing a state of the software itself which is programmed to operate and a method of analyzing a software management operation by a user, it is possible to increase reliability.

Further, according to one embodiment of the present invention, even if a user does not register the software in the white list one by one, normal software is automatically detected and registered, and thus, it is possible to automatically block malicious software and unnecessary software to be executed in the terminal, to save resources without monitoring all types of software in the terminal, and to block an operation of the malicious software unknown to the user.

DETAILED DESCRIPTION OF THE EMBODIMENTS

Figure 1:
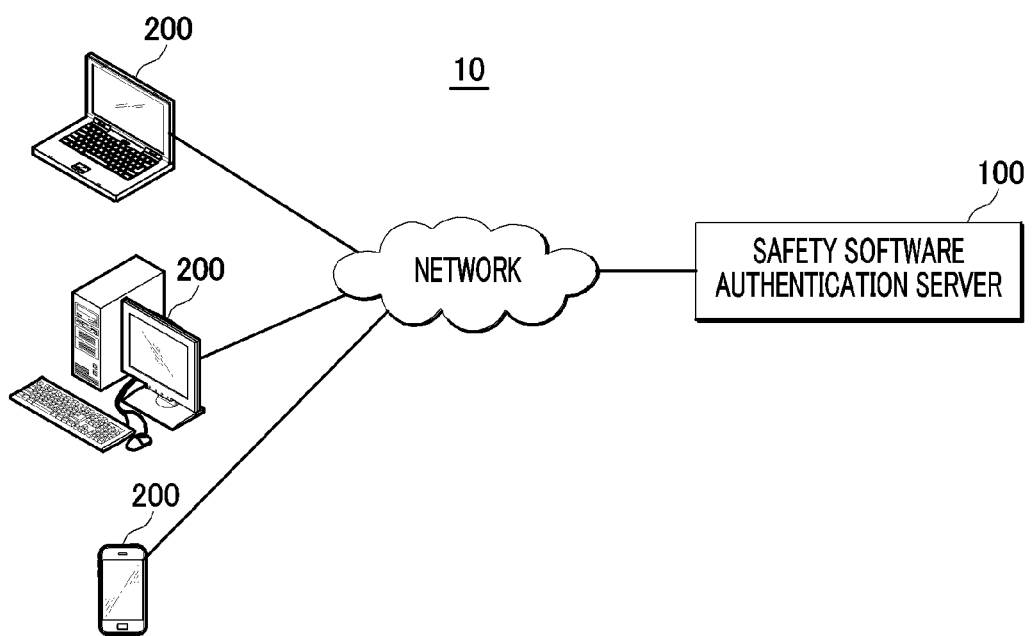
FIG. 1 is a configuration diagram of a safety software authentication system according to one embodiment of the present invention.

Hereinafter, embodiments of the present invention will be described in detail with reference to the accompanying drawings such that those skilled in the art may easily implement the present invention. The present invention may be embodied in many different forms and not limited to the embodiments described herein. Parts irrelevant to the description are omitted in the drawings so as to clearly describe the present invention, and similar parts are denoted by similar reference numerals throughout the specification.

Throughout the specification, when it is described that a part is "connected" to another part, it also includes a case where it is not only "directly connected" but also "electrically connected" with another element therebetween. Further, when it is described that a part "includes" a certain configuration element, which means that it may further include other configuration elements, not exclude the other configuration elements unless otherwise stated.

In the present specification, a term "portion" includes a unit realized by hardware, a unit realized by software, and a unit realized by both. Further, one unit may be realized by using two or more pieces of hardware, and two or more units may be realized by one piece of hardware. Meanwhile, "~ portion" is not limited to software or hardware, and "~ portion" may be configured to be in an addressable storage medium or may be configured to reproduce one or more processors. Thus, as an example, "~ portion" includes software configuration elements, object-oriented software configuration elements, configuration elements such as class configuration elements and task configuration elements, processes, functions, attributes, procedures, subroutines, segments of program code, drivers, firmware, a microcode, a circuit, data, a database, data structures, tables, arrays, and variables. A function provided within the configuration elements and the "~ portions" may be further combined into the smaller number of configuration elements and the "~ portions" or may be further separated into additional configuration elements and the "~ portions". In addition, the configuration elements and "~ portions" may be realized to play one or more CPUs in a device or a secure multimedia card.

A term "terminal" which will be described below may be realized by a computer, a portable terminal, and an Internet of things device, and the like that may be connected to a server or another terminal through a network. Here, the computer may include, for example, a notebook computer in which a Web browser is installed, a desktop computer, a laptop computer, and the like, and a portable terminal is a wireless communication device with portability and mobility and may include all kinds of handheld-based wireless communication device such as international mobile telecommunication (IMT)-2000, code division multiple access (CDMA)-2000, w-code division multiple access (W-CDMA), a long term evolution (LTE) communication-based terminal, a smartphone, and a tablet PC. Further, a "network" may be realized by all types of wired and wireless networks, for example, a wired network such as a local area network (LAN), a wide area network (WAN), or a value added network (VAN), a mobile radio communication network, a satellite communication network, an Internet of things network, and the like.

Hereinafter, each configuration and operation of a safety software authentication system according to one embodiment of the present invention and a safety software authentication method according to the embodiment will be described in detail with reference to the accompanying drawings.

FIG. 1 is a configuration diagram of a safety software authentication system according to one embodiment of the present invention.

As illustrated in FIG. 1, the safety software authentication system 10 includes a software authentication server 100 and a plurality of safety software authentication terminals 200 which are connectable to the server 100 through a network.

For reference, the safety software authentication terminals 200 may be terminal devices such as various user terminals or Internet of things (IoT) devices, and a type thereof is not limited. Hereinafter, for the sake of convenient description, the safety software authentication terminal 200 will be referred to as a client terminal 200.

The software authentication server 100 provides a security program (hereinafter, referred to as a "safety software authentication program") for a software authentication to the connected client terminal 200. As such, the safety software authentication program distributed through the software authentication server 100 and an execution method thereof will be described in detail through execution and a drive procedure of the safety software authentication program installed on the client terminal 200 below.

The software authentication server 100 is periodically connected to the plurality of client terminals 200 for communication and receives software information reported by a security solution (that is, a solution of the safety software authentication program) installed in each of the client terminals 200.

In this case, the software information reported by the client terminals 200 includes at least one of a white list, a rating of the software, an operation pattern analyzed as a result of monitoring the software, and user behavior related information. In one embodiment of the present invention, he user behavior related information Includes general information on the software in which intent of a user is reflected, such as the type of software (that is, a file or a program) held (that is, installed or used) by the client terminal 200 and the number of times of execution of the software.

Further, the software authentication server 100 updates the white list previously stored based on the software information reported by the plurality of client terminals 200 and provides the updated white list to the client terminals 200. At this time, the white list provided to the client terminal 200 may be automatically updated and stored by the safety software authentication program installed in the client terminal 200. That is, the client terminal 200 may periodically update the latest white list to process a software authentication. For reference, in one embodiment of the present invention, the white list is a list including information on verified safety software according to a plurality of preset conditions.

The client terminal 200 is connected to the software authentication server 100 through a network, installs and executes a safety software authentication program provided from the software authentication server 100.

Specifically, the client terminal 200 may be connected to the server 100 to download and install the safety software authentication program, and the safety software authentication program may be set to automatically operate if the client terminal 200 is started and the operation system is driven.

Hereinafter, operations to be processed by the client terminal 200 by executing the safety software authentication program will be described in detail with reference to FIG. 2.

Figure 2:
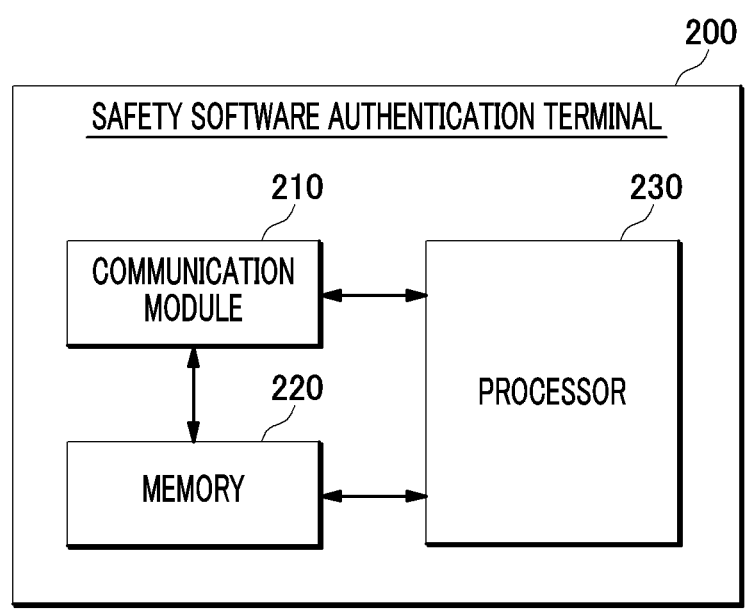
FIG. 2 is a configuration diagram of a safety software authentication terminal according to the embodiment of the present invention.

FIG. 2 is a configuration diagram of the safety software authentication terminal according to the embodiment of the present invention.

As illustrated in FIG. 2, the client terminal 200 includes a communication module 210, a memory 220, and a processor 230.

The communication module 210 transmits and receives data to and from the software authentication server 100 under a control of the processor 230.

At this time, the communication module 210 receives all the data for installing the safety software authentication program from the software authentication server 100 and transmits various types of data to be reported to the software authentication server 100 according to the drive of the safety software authentication program whose installation is completed.

The memory 220 stores the safety software authentication program received from the software authentication server 100 and stores various types of data generated as the safety software authentication program is executed by the processor 230.

Further, various types of data according to driving of an operation system (OS) of the client terminal 200 may be recorded in the memory 220, and a plurality of previously stored data may be further stored according to a purpose and a function of the client terminal 200.

For example, when the client terminal 200 is a personal wireless communication terminal such as a smartphone, the memory 220 may store data and a program for operating as a telephone for a voice call, a data call, and the like. Since the program stored in the client terminal 200 is not limited and the program is not significantly related to a core feature of the present invention, detailed description thereof will be omitted.

The processor 230 executes the program stored in the memory 220 and processes an operation according to the program.

The processor 230 detects a white list verification target of software (that is, a file or a program) installed or stored in the client terminal 200 according to execution of the safety software authentication program.

For example, if a user double-clicks a specific file (for example, "patentdraft.doc") on the client terminal 200, a program (for example, "Microsoft Word") linked to a corresponding file is executed. Through this process, processing content of the corresponding program is recorded in the memory 220, and thus, the processor 230 may confirm whether or not a specific file and a program associated with the specific file is currently executed by checking whether there is a program (that is, software) recorded in the memory 220. As such, the processor 230 detects the software that is confirmed to be currently executed as the whitelist verification target.

In addition, the processor 230 checks whether the verification target program (that is, software) is included in the white list provided through the safety software authentication program.

At this time, when the verification target program is software registered in the white list, the processor 230 normally executes the corresponding program.

In addition, when it is determined that the program is not registered in the white list, the processor 230 checks whether the program executed in association with the specific file satisfies at least one of "technical conditions" and "social engineering conditions" which are previously determined. That is, the processor 230 determines whether the verification target program (that is, software) may be additionally registered in the white list. The processor 230 may first perform a malicious software check on a program not registered in the whitelist, and then proceed with a white list registration procedure.

For example, the technical conditions may include at least one of existence or nonexistence of a digital signature (that is, a signature of a certified authority) for a verification target software, existence or nonexistence of a file description, updating or non-updating of a file version, updating or non-updating of a product version, existence or nonexistence of a product name, existence or nonexistence of a copyright, existence or nonexistence of a previously recorded group name or user name, completion or non-completion of a program registration procedure on an OS, a process Identifier (PID) range designated by the OS, existence or nonexistence of an OS registration of a parent PID, existence or nonexistence of a previously authorized software database, existence or nonexistence of an uninstalled file (uninstall file), possibility or impossibility of analysis using an artificial intelligence (for example, deep learning, machine learning, or the like) technology, and existence or nonexistence of a history analyzed by using the artificial intelligence technology.

For reference, the PID is a series of numbers indicating the process itself, and a PID of a parent process that executes the process itself is called a PPID.

Further, the social engineering conditions may include at least one of at least one execution or non-execution of the verification target program by an input device (that is, a keyboard, a mouse, a pen, a touch pad, or the like), possibility or impossibility of interpretation of a program file name (for example, human-readable characters, or the like), possibility or impossibility of interpretation of a program product name and copyright information, elapse or non-elapse of a reference period of a program execution time (that is, a period more than the reference period elapses from a period when the program is executed last), information on whether or not a use rate of a user is greater than a threshold, and existence or nonexistence of user authentication greater than a reference percentage (%).

For reference, in a field of computer security, the social engineering means an act of obtaining information by using non-technical means based on trust of a human interaction. Based on this, in the present invention, the social engineering conditions means software conditions relating to a user behavior (a direct act, a semantic interpretation or the like) in addition to technical conditions processed only by a system itself of the client terminal 200.

Then, the processor 230 sets a grade according to the number of the above-described conditions satisfied by the corresponding program. At this time, the grade of the program may be set to a plurality of levels (for example, 1 to 7 grades), and the processor 230 registers a program having a grade higher than or equal to a preset reference level to the white list.

Further, the processor 230 may register the corresponding program having one or more grades among the grades that can be added to the white list in the whitelist and register the corresponding program as a main monitoring target at the same time. That is, even if the software is included in the white list, when the software is determined to be below a certain grade, a condition search for adding the white list may be retried and maintained as a malicious software inspection target.

Specifically, the processor 230 may continuously monitor whether or not the inspection target program is malicious software even after being registered in the white list.

For example, when a program executed in association with a specific file modifies a specific file in the client terminal 200, in a case where attributes of an original file before modification is compared with a modified file and the changed value exceeds a preset reference, the specific file is recognized as malicious software. A determination reference of the changed value may be set as the number of times of opening or saving a file, generation or regeneration of a file name, modification of a file, deletion of a file, and the like, and when the number of actions such as opening or saving a file exceeds the reference number of times (for example, 10 times) within a preset time (for example, seconds), the software determined to be the malicious software. As such, when the software is previously registered in the white list and is determined to be the malicious software at a certain execution time, the processor 230 causes execution of the program to be stopped/blocked and to be removed from the white list, and outputs a user warning/notification message.

Further, the processor 230 performs a data backup for the file executed by the user and performs backup processing of the execution file in a separate storage region (that is, storage separate from the storage region used originally as the file is executed) in a storage (for example, a hard disk or the memory 220) of the client terminal 200. Through this, even if the program is registered in the white list, it is possible to provide backed up data even when an error or a problem due to a malware code infection is generated.

Meanwhile, in a case of a program that is determined to be a grade below the reference level or has no satisfying condition as a result of determining whether or not the white list is additionally registered, the processor 230 performs a program security procedure such as output of a user warning message, isolation of a program, and check processing of malicious software. At this time, the processor 230 may perform a program security procedure which is the same as the "procedure for continuously monitoring whether or not the certain program described above is the malicious software even after being registered in the white list".

Hereinafter, a safety software authentication method according to another embodiment of the present invention will be described in detail with reference to FIG. 3.

Figure 3:
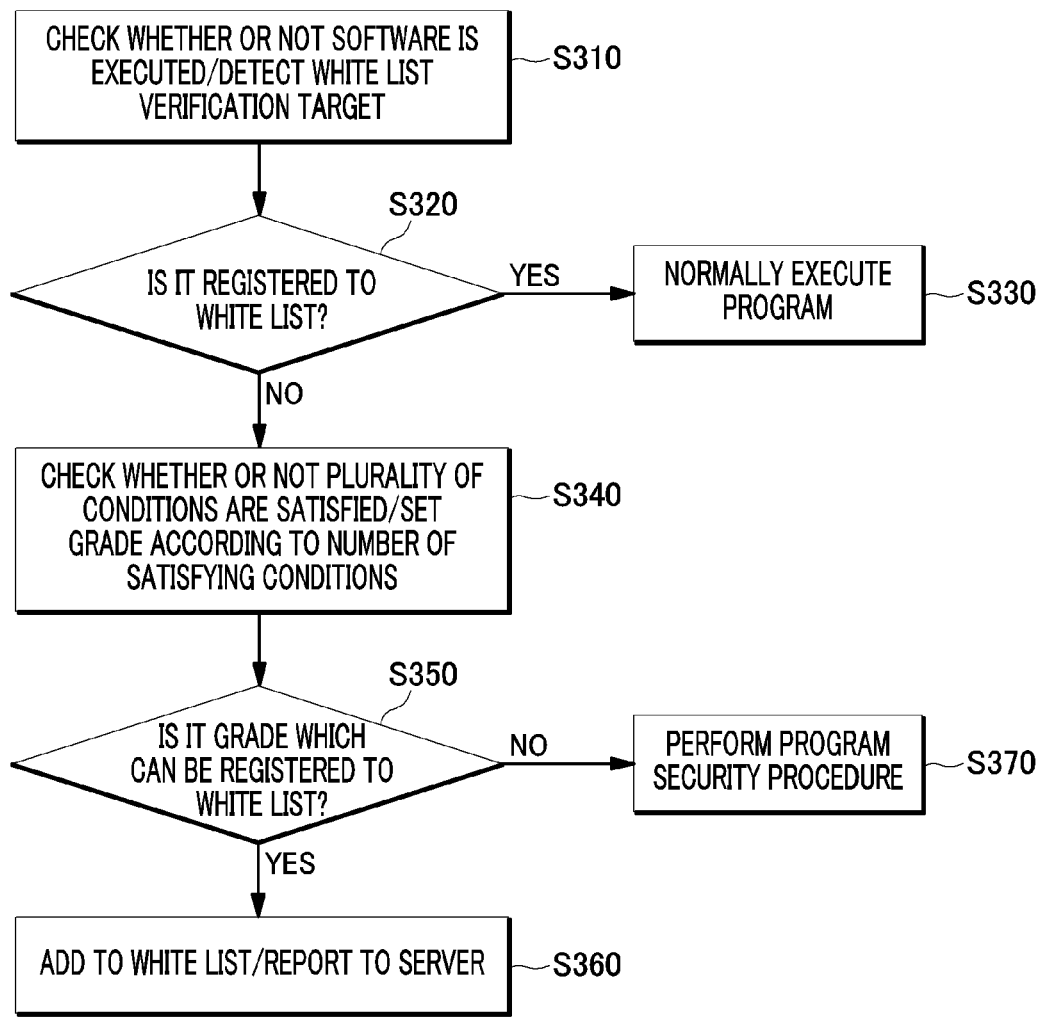
FIG. 3 is a flowchart illustrating a safety software authentication method according to another embodiment of the present invention.

FIG. 3 is a flowchart illustrating the safety software authentication method according to another embodiment of the present invention.

Each step illustrated in FIG. 3 is processed by the client terminal 200, and the client terminal 200 may be a terminal device such as a user terminal or an IoT device. Further, in FIG. 3, a state where the client terminal 200 downloads a safety software authentication program from the software authentication server 100 and installation is completed will be described.

First, a white list verification target is detected by frequently checking whether or not software installed in the terminal 200 is executed (S310).

Next, it is determined whether or not the software (that is, a program) that is the whitelist verification target is previously registered in a white list (S320).

When the verification target software is previously registered in the white list, a corresponding program is normally executed (S330), and an inspection for malicious software may be performed according to a program grade recorded in the white list. That is, when the inspection target program has a grade lower than or equal to a preset level, the following condition search procedure is retried or the malicious software is inspected before a normal execution is performed.

Meanwhile, when the verification target software is a program not registered in the white list, whether or not the white list can be additionally registered is determined by checking a satisfying condition from among a plurality of preset inspection conditions (S340).

At this time, the plurality of inspection conditions and the white list are set or stored previously in the safety software authentication program. Further, the plurality of inspection conditions include "technical conditions" which can be processed only by the system itself of the client terminal 200 and "social engineering conditions" relating to an action of a user in addition to the "technical conditions", and examples of the respective conditions are described in detail with reference to FIG. 2.

A grade is determined according to the number of conditions satisfied by the verification target software by checking the check result in step S340. Specifically, when a grade of the verification target software is higher than or equal to a reference level of a grade classified into a plurality of levels, it is determined that the verification target software may be registered in the white list.

Further, separately from step S340, the malicious software may be monitored in parallel. That is, separately from determining whether or not the white list may be added to various types of software executed by the client terminal 200, the verification target software may be immediately detected as malicious software through real-time monitoring of the malicious software.

Next, it is determined whether or not the verification target software has a grade that may be additionally registered (S350), and when the grade may be additionally registered, a corresponding program is added to the white list and software information is reported to the software authentication server 100 (S360).

At this time, the software information reported to the software authentication server 100 may include the white list, grades for each software included in the white list, pattern information according to a result of continuously monitoring the software included in the white list, and information on a user behavior for the software included in the white list.

Further, in a case of one or more grades of the grades that may be added to the white list, the corresponding program may be registered in the white list and registered as a main monitoring target at the same time.

Meanwhile, when the verification target software has a grade that may not be additionally registered, a program security procedure, such as output of a user warning message, isolation of a program, and inspection processing of the malicious software, is performed (S370).

Separately from the above steps, the client terminal 200 may be periodically connected to the software authentication server 100 by executing the safety software authentication program to upload a white list thereof, and may also download and update the latest white list (that is, white list updated by a software information report of the plurality of client terminals 200) from the software authentication server 100. At this time, the updated white list may be generated by the authentication server 100 through analysis and determination thereof based on the white list contents of the plurality of client terminals 200 as well as the software information reported to the authentication server 100.

One embodiment of the present invention may also be implemented in the form of a recording medium including a command which may be executed by a command such as a program module executed by a computer. A computer readable medium may be any available medium that may be accessed by the computer and includes both a volatile and nonvolatile medium and a removable and non-removable medium. Further, the computer readable medium may include any type of a computer storage medium. The computer storage medium includes both the volatile and non-volatile medium and the removable and non-removable medium realized by using a certain method or technology for storing information such as a computer readable command, a data structure, a program module or other data.

Although the method and system of the present invention are described in connection with specific embodiments, some or all of a configuration element or an operation thereof may be implemented by using a computer system having a general purpose hardware architecture.

The description of the present invention described above is for an illustrative purpose, and those skilled in the art to which the present invention belongs will understand that the present invention may be easily modified in other specific forms without changing the technical idea or essential features of the present invention. Therefore, it should be understood that the embodiments described above are exemplary in all respects and not restrictive. For example, each configuration element described as a single type may be implemented in a distributed manner, and similarly, configuration elements described as distributed may be implemented in a combined form.

The scope of the present invention is shown by the following claims rather than the specification, and all changes or modifications derived from the meaning and scope of the claims and their equivalents should be interpreted as being included in the scope of the present invention.

What is claimed is:

1. A safety software authentication terminal comprising:
a memory that stores a safety software authentication program; and
a processor that executes the program stored in the memory,
wherein the processor is configured to detect software executed among a plurality of types of software installed in the terminal as a whitelist verification target, according to execution of the safety software authentication program, determine whether or not to register a verification target software in a white list, normally execute the verification target software when the verification target software is registered in the white list, determine a grade for the verification target software based on the number of satisfying conditions among a plurality of preset conditions when the verification target software is not registered in the white list, and add the verification target software to the whitelist when the grade of the verification target software is greater than a first preset level,
wherein the processor is configured to determine that the verification target software has a high level grade as the number of conditions that the verification target software satisfies among the plurality of conditions increases,
wherein, in response to determining that the verification target software is registered in the white list and the grade of the verification target software is lower than a second preset level that is greater than the first preset level, the processor is configured to register the verification target software as a monitoring target and performs a preset software inspection for the verification target software to determine whether or not the verification target software is malicious software, and
in response to determining that the verification target software is registered in the white list and the grade of the verification target software is greater than the second preset level, the processor is configured to execute the verification target software without performing the preset software inspection, and
wherein the plurality of conditions include technical conditions that an operating system of the terminal is checkable and social engineering conditions that are checkable based on a behavior of a user, and
wherein the processor is configured to perform data backup for a file executed by the verification target software in a certain storage region in the terminal.

2. The safety software authentication terminal according to claim 1,
wherein the technical conditions include at least one of existence or nonexistence of a digital signature of the verification target software, existence or nonexistence of a file description, updating or non-updating of a file version, updating or non-updating of a product version, existence or nonexistence of a product name, existence or nonexistence of a copyright, existence or nonexistence of a previously recorded group name or user name, completion or non-completion of a program registration procedure on an operating system, a process Identifier (PID) range designated by the operating system, existence or nonexistence of an operating system registration of a parent PID, existence or nonexistence of a previously authorized software database, existence or nonexistence of an uninstalled file, possibility or impossibility of analysis using an artificial intelligence technology, and existence or nonexistence of a history analyzed by using the artificial intelligence technology, and
wherein the social engineering conditions include at least one execution or non-execution of the verification target software by an input device, possibility or impossibility of interpretation of a file name, a product name, and copyright information, elapse or non-elapse of a reference period of execution time, magnitude of a reference value of a use rate, and existence or nonexistence of a user authentication greater than a reference percentage.

3. The safety software authentication terminal according to claim 1, wherein, when a specific file stored in the terminal is modified by the verification target software which is the monitoring target, the processor is configured to compare attributes of an original file of the specific file with attributes of the modified file of the specific file, and when a changed attribute value exceeds a preset criterion, the processor is configured to determine the verification target software as the malicious software and removes the verification target software from the white list.

4. The safety software authentication terminal according to claim 1, further comprising:
a communication module for transmitting and receiving data to and from a software authentication server,
wherein the processor is configured to download the safety software authentication program from the software authentication server through the communication module, reports software information including information of the verification target software added to the white list to the software authentication server, and updates the software information.

5. A safety software authentication method performed by a safety software authentication terminal, the method comprising:
(a) detecting software executed among a plurality of types of installed software as a whitelist verification target;
(b) determining whether or not to register a verification target software in a white list;
(c) determining a grade for the verification target software based on the number of satisfying conditions among a plurality of preset conditions when the verification target software is not registered in the white list;
(d) adding the verification target software to the white list when the grade of the verification target software is greater than a first preset level, and
(e) when in response to determining that the verification target software is registered in the white list and the grade of the verification target software is lower than a second preset level that is greater than the first preset level, registering the verification target software as a monitoring target and performing a preset software inspection for the verification target software even after the white list registration to determine whether or not the verification target software is malicious software, and in response to determining that the verification target software is registered in the white list and the grade of the verification target software is greater than the second preset level, executing, by a processor of the safety software authentication terminal, verification target software without performing the preset software inspection,
wherein the step of (c) comprises determining that the verification target software has a high level grade as the number of conditions that the verification target software satisfies among the plurality of conditions increases,
wherein the plurality of conditions include technical conditions that an operating system of the terminal is checkable and social engineering conditions that are checkable based on a behavior of a user, and performing, by the processor, data backup for a file executed by the verification target software in a certain storage region in the terminal.

6. The safety software authentication method according to claim 5,
wherein the technical conditions include at least one of existence or nonexistence of a digital signature of the verification target software, existence or nonexistence of a file description, updating or non-updating of a file version, updating or non-updating of a product version, existence or nonexistence of a product name, existence or nonexistence of a copyright, existence or nonexistence of a previously recorded group name or user name, completion or non-completion of a program registration procedure on an operating system, a process Identifier (PID) range designated by the operating system, existence or nonexistence of an operating system registration of a parent PID, existence or nonexistence of a previously authorized software database, existence or nonexistence of an uninstalled file, possibility or impossibility of analysis using an artificial intelligence technology, and existence or nonexistence of a history analyzed by using the artificial intelligence technology, and
wherein the social engineering conditions include at least one execution or non-execution of the verification target software by an input device, possibility or impossibility of interpretation of a file name, a product name, and copyright information, elapse or non-elapse of a reference period of execution time, magnitude of a reference value of a use rate, and existence or nonexistence of a user authentication greater than a reference percentage.

7. The safety software authentication method according to claim 5, further comprising:
downloading a safety software authentication program from a software authentication server before the (a) step
wherein the steps (a) to (d) are performed by executing the downloaded safety software authentication program, and
wherein, after the step (d), software information including information of the verification target software added to the white list is reported to the software authentication server, and the whitelist and analysis information on each verification target software are received from the software authentication server, and thereafter, the white list stored in the terminal is updated.

8. A non-transitory computer readable storage medium having a program recorded therein for performing a method comprising:
(a) detecting software executed among a plurality of types of installed software as a whitelist verification target;
(b) determining whether or not to register a verification target software in a white list;
(c) determining a grade for the verification target software based on the number of satisfying conditions among a plurality of preset conditions when the verification target software is not registered in the white list;
(d) adding the verification target software to the white list when the grade of the verification target software is greater than a first preset level, and
(e) when in response to determining that the verification target software is registered in the white list and the grade of the verification target software is lower than a second preset level that is greater than the first preset level, registering the verification target software as a monitoring target and performing a preset software inspection for the verification target software even after the white list registration to determine whether or not the verification target software is malicious software, and in response to determining that the verification target software is registered in the white list and the grade of the verification target software is greater than the second preset level, executing, by a processor, the verification target software without performing the preset software inspection, wherein the step of (c) comprises determining that the verification target software has a high level grade as the number of conditions that the verification target software satisfies among the plurality of conditions increases, wherein the plurality of conditions include technical conditions that an operating system of the terminal is checkable and social engineering conditions that are checkable based on a behavior of a user, and performing, by the processor, data backup for a file executed by the verification target software in a certain storage region in the terminal.

\* \* \* \* \*